J. MALLORY.

Gridiron.

No. 83,649.

Patented Nov. 3, 1868.

WITNESSES:
John L. Lewis
Charles Hetchner

INVENTOR
John Mallory.

JOHN MALLORY, OF PENN YAN, NEW YORK.

Letters Patent No. 83,649, dated November 3, 1868.

IMPROVEMENT IN BROILERS.

The Schedule referred to in these Letters Patent and making part of the same.

*To all whom it may concern:*

Be it known that I, JOHN MALLORY, of Penn Yan, in the county of Yates, and State of New York, have invented a new and useful Improvement in Broilers; and I do hereby declare that the following is a full, clear, and exact description of the construction and operation of the same, reference being had to the annexed drawing, making a part of this specification, in which—

Figure 1:
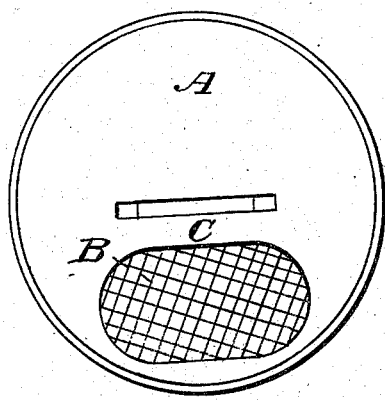
Figure 2:
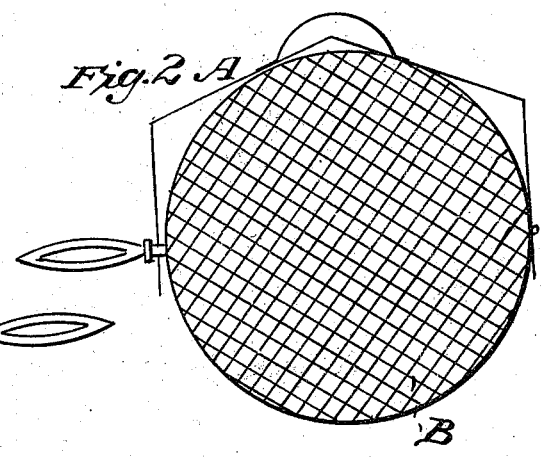
Figure 3:
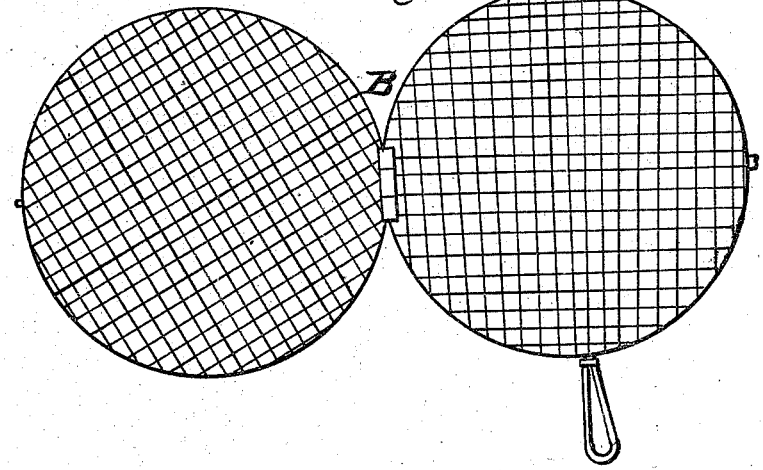

Figure 1 is a top view,
Figure 2 a vertical section, and
Figure 3 is a view of the gridiron.

The letters of reference refer to the same parts in each figure.

The nature of my invention consists in making a broiler that may be used on all kinds of stoves that have covers over the fire-place, by removing the cover and placing the broiler in its place with the gridiron within it. The gridiron is made double, so that it may be revolved, for the purpose of broiling both sides of the meat, without removing it from the stove, thus preventing meat being exposed to cold air during the process of broiling, thus saving time and the flavor of the meat. It is also provided with an opening in the top, that will allow the cook to examine the meat while broiling, without exposing it to cold air, or retarding the broiling.

To enable others skilled in the art to make and use my invention, I will proceed to describe its mode of construction and operation.

A is the case. It is made of sheet or cast-metal, and may be made any form or size that will allow the gridiron to revolve. The lower edge has holes for the pivot of the gridiron, and an opening in the top, as shown in fig. 1.

B is the gridiron. It may be made of wire or cast-metal. It is made in two parts, and hinged together, as shown in fig. 3. It has pivots at each side, that hold it in place in the case, and allow it to revolve. One of the pivots may terminate in a handle, that may be used to carry it by, and turn it with while broiling. Upon the pivot or handle, should be a flat piece or part, that will prevent it revolving, by means of a spring-catch or latch, that may be applied to it. It is made in two parts for the purpose of holding meat while being broiled, so that it may be turned without removing it from the fire, for the purpose of preventing cold air coming in contact with the meat while being broiled, thus saving much of the good properties of the meat, as well as time and trouble. The two parts are held together by a hook or clasp.

C is an opening in the upper part of the case, or it may be made in the side, or both, if desired. This opening must be covered with a transparent cover, such as glass or mica, so that the cook may have opportunity to observe the progress of broiling, thus obviating the danger of burning, and the trouble of taking the meat out in the cold air before it is sufficiently broiled.

Having thus fully described my invention,
What I claim as new, and desire to secure by Letters Patent, is as follows:

I claim the gridiron B, when made as specified, and used in combination with the case A, substantially as set forth.

Also, the opening in the case, when made as and for the purpose herein specified.

JOHN MALLORY.

Witnesses:
JOHN L. LEWIS,
CHARLES KETCHUM.